(12) United States Patent
Caceres et al.

(10) Patent No.: US 9,709,413 B2
(45) Date of Patent: Jul. 18, 2017

(54) DIRECTIONS BASED ON PREDICTED FUTURE TRAVEL CONDITIONS

(71) Applicant: Cellco Partnership, Basking Ridge, NJ (US)

(72) Inventors: Manuel E. Caceres, Basking Ridge, NJ (US); Yuk Lun Li, Morganville, NJ (US); Craig Jackowski, Belleville, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 197 days.

(21) Appl. No.: 14/104,343

(22) Filed: Dec. 12, 2013

(65) Prior Publication Data

US 2015/0168169 A1 Jun. 18, 2015

(51) Int. Cl.
*G01C 21/34* (2006.01)
*G08G 1/01* (2006.01)
*G08G 1/0968* (2006.01)

(52) U.S. Cl.
CPC ....... *G01C 21/3492* (2013.01); *G08G 1/0112* (2013.01); *G08G 1/0133* (2013.01); *G08G 1/0141* (2013.01); *G08G 1/096811* (2013.01); *G08G 1/096844* (2013.01)

(58) Field of Classification Search
CPC ....... G08G 1/096716; G08G 1/096741; G08G 1/096758; G08G 1/096775; G01C 21/3691
USPC .......................................... 701/414, 423, 537
See application file for complete search history.

(56) References Cited

U.S. PATENT DOCUMENTS

| | | | | |
|---|---|---|---|---|
| 6,111,539 | A * | 8/2000 | Mannings et al. | 342/357.31 |
| 6,177,873 | B1 * | 1/2001 | Cragun | G01W 1/00 340/601 |
| 6,317,686 | B1 * | 11/2001 | Ran | 701/533 |
| 7,609,176 | B2 * | 10/2009 | Yamane et al. | 340/994 |
| 8,406,998 | B2 * | 3/2013 | Shaffer et al. | 701/414 |
| 8,489,324 | B2 * | 7/2013 | Hendrey | 701/423 |
| 2005/0256639 | A1 * | 11/2005 | Aleksic et al. | 701/210 |
| 2009/0070024 | A1 * | 3/2009 | Burchard et al. | 701/117 |
| 2009/0271101 | A1 * | 10/2009 | Relyea et al. | 701/118 |
| 2012/0130625 | A1 * | 5/2012 | Srivastava | 701/119 |

OTHER PUBLICATIONS

Wikipedia, "GPS navigation device", http://en.wikipedia.org/wiki/GPS_navigation_device, Oct. 23, 2013, 7 pages.

* cited by examiner

*Primary Examiner* — Redhwan K Mawari
*Assistant Examiner* — Anshul Sood (57) ABSTRACT

A device is configured to receive a request for directions from a user device. The device determines a start time, a start location, and a destination location for the directions. The device determines a route from the start location to the destination location and obtains travel condition information corresponding to the route. The travel condition information indicates a traffic condition or a weather condition. The device predicts a future travel condition along the route based on the travel condition information and the start time. The device generates the directions based on the future travel condition and provides the directions to the user device.

20 Claims, 8 Drawing Sheets

FIG. 2

DIRECTIONS BASED ON PREDICTED FUTURE TRAVEL CONDITIONS

BACKGROUND

Global positioning system ("GPS") devices are commonly used by people to find directions to destinations. For example, a person may input a start location and a destination location to a GPS device. The GPS device may then provide the person with directions from the start location to the destination location.

DETAILED DESCRIPTION OF PREFERRED EMBODIMENTS

The following detailed description of example implementations refers to the accompanying drawings. The same reference numbers in different drawings may identify the same or similar elements.

A navigation device, such as a GPS device or a smart phone, may provide directions to a destination location. However, a user may desire directions that take into account future travel conditions along a route to the destination location. In other words, a user may desire to avoid a future travel condition (e.g., a thunderstorm or a traffic jam) that currently does not affect the route to the destination location, but that will affect the route by the time the user gets there. Implementations described herein may provide a user with more desirable directions by predicting future travel conditions and providing directions based on the future travel conditions.

Figure 1:
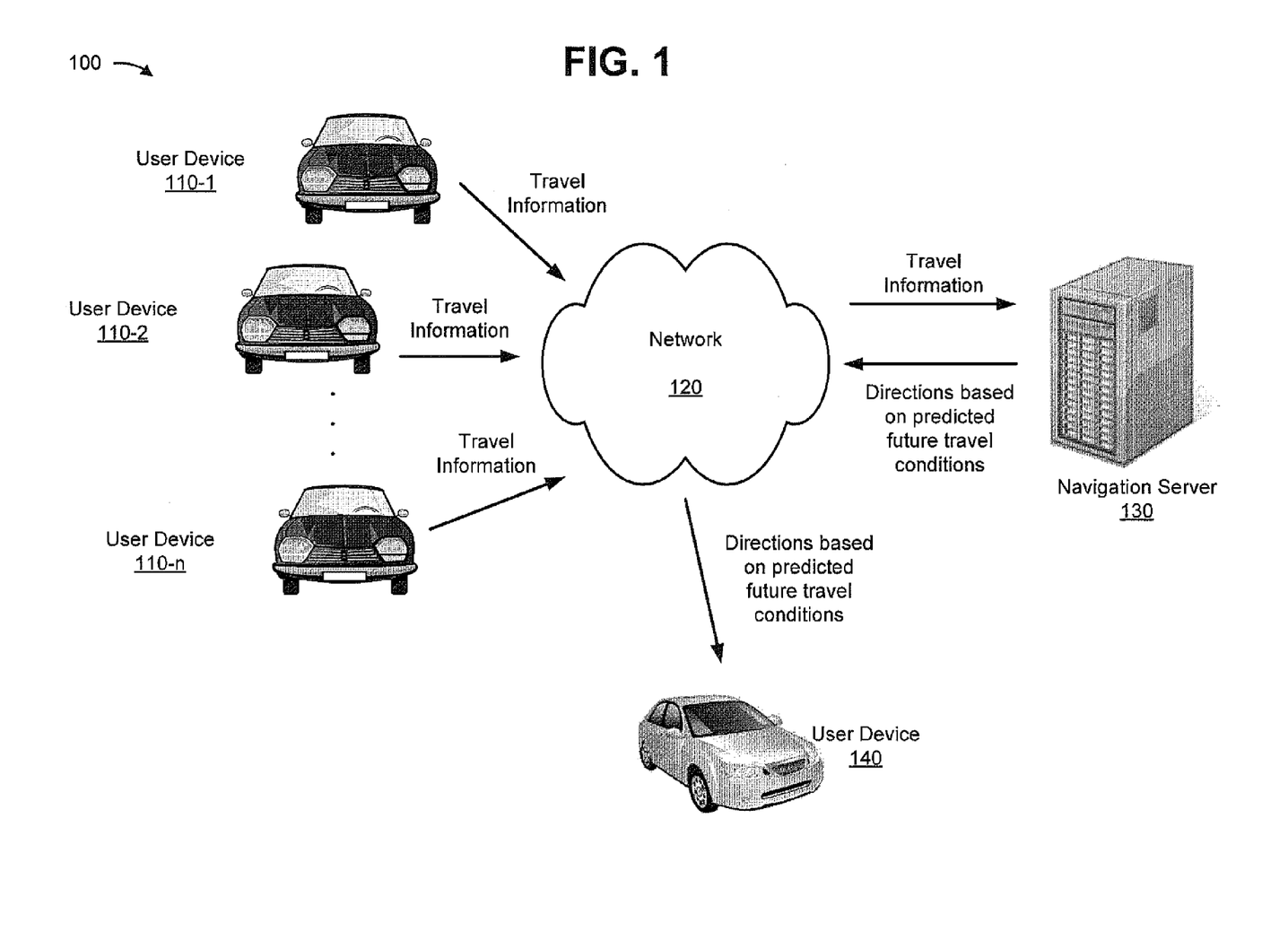
FIG. 1 is a diagram of an overview of an example implementation described herein.

FIG. 1 is a diagram illustrating an overview of an example implementation 100 described herein. Assume multiple user devices 110-1 to 110-$n$ (e.g., car navigation devices, smart phones, etc.) are currently traveling. Each user device 110-1 to 110-$n$ may transmit travel information via a network 120 to a navigation server 130. For example, the travel information transmitted by each user device 110 may indicate a current location, a current speed, a destination location, a route to the destination location, etc. Navigation server 130 may compile the travel information transmitted by each user device 110. For example, navigation server 130 may use crowdsourcing to obtain a large amount of travel information indicating a current status of traffic conditions and peoples' intended travel.

Navigation server 130 may predict future travel conditions based on the travel information obtained from user devices 110. For example, based on the current location of user device 110-1, the destination location of user device 110-1, and the route to the destination location of user device 110-1, navigation server 130 may predict where along the route user device 110-1 will be in the future and when user device 110-1 will be there. Likewise, navigation server 130 may predict when and where each of the user devices 110-1 to 110-$n$ will be in the future. Accordingly, navigation server 130 may predict that a high number of user devices 110 will be at a same location at a same time causing a traffic jam, even though there is not currently a traffic jam at the location.

Assume a user device 140 requests that navigation server 130 provide directions to a destination location and one possible route to the destination location includes the location with the predicted traffic jam. Further, assume user device 140 desires to leave at time that would result in the user being at the location when the traffic jam is predicted. Accordingly, navigation server 130 may generate and provide directions to user device 140 that would avoid the location even though there is no traffic jam at the location yet.

In this way, navigation server 130 may provide more useful directions to user device 140 by predicting future travel conditions and generating the directions based on the predicted future travel conditions.

Figure 2:
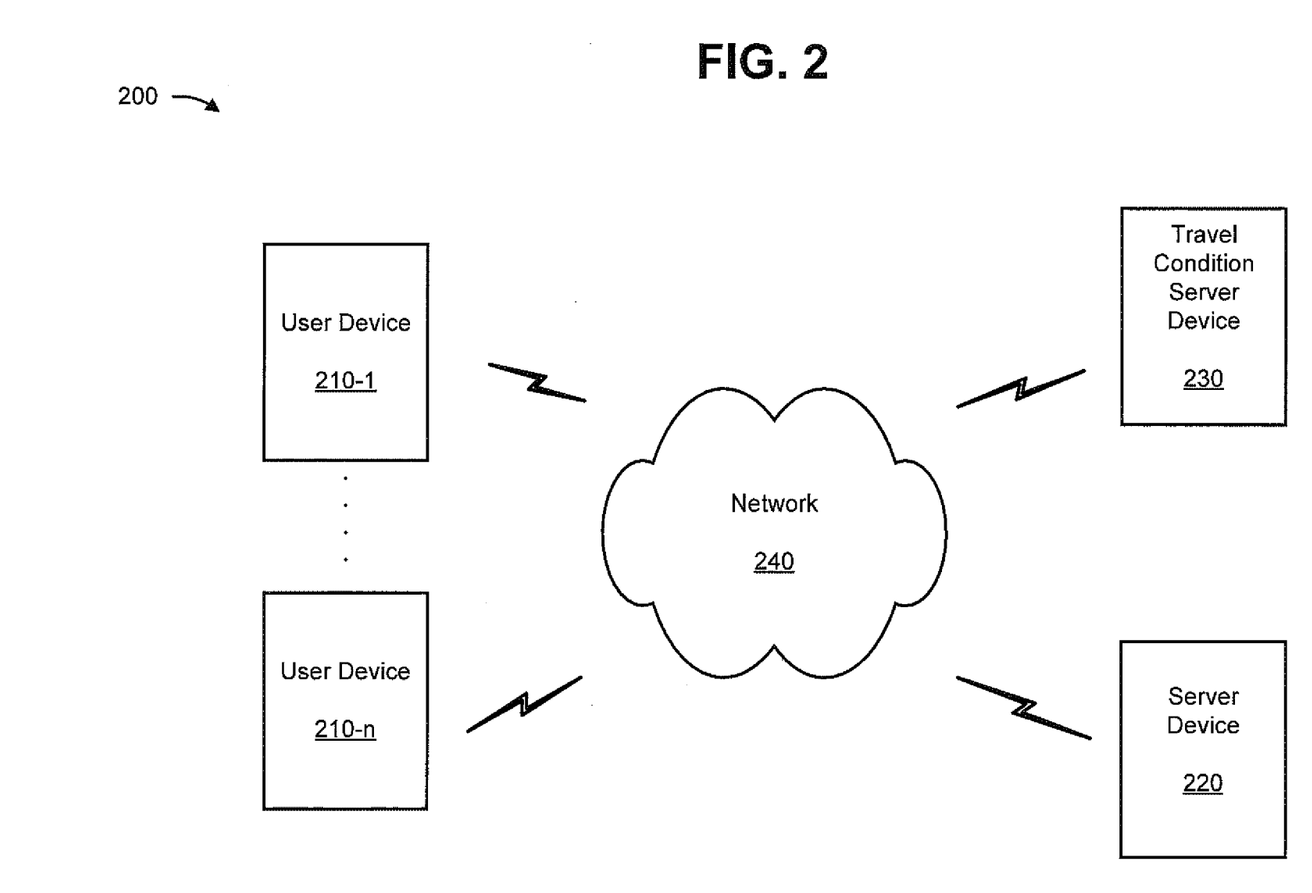
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include user devices 210-1 to 210-$n$ (n≥1) (referred to generally as "user devices 210" or individual as "user device 210"), a server device 220, a travel condition server device 230, and a network 240.

User device 210 may include a device capable of receiving and providing information. For example, user device 210 may include a mobile phone (e.g., a smart phone, a radiotelephone, etc.), a computing device (e.g., a laptop computer, a tablet computer, a handheld computer, a camera, an audio recorder, a camcorder, etc.), a navigation device (e.g., a car navigation system), or a similar device. In some implementations, user device 210 may include a communication interface that allows user device 210 to receive information from and/or transmit information to server device 220 and/or another device in environment 200. In some implementations, user device 210 may include sensors, such as a camera, a microphone, an accelerometer, a gyroscope, a GPS device, a magnetometer, a gravity sensor, a rotational sensor, a temperature/thermal sensor, a proximity sensor, a light sensor, a pressure sensor, a humidity sensor, an infrared sensor, a radio wave sensor, a dual lens camera, and/or another component that permits user device 210 to receive input and/or detect conditions in a vicinity of user device 210.

Server device 220 may include one or more devices capable of processing and/or routing information. In some implementations, server device 220 may include a communication interface that allows server device 220 to receive information from and/or transmit information to other devices in environment 200. For example, server device 220 may communicate with user devices 210 and/or travel condition server device 230.

Travel condition server device 230 may include one or more devices capable of processing and/or routing information. In some implementations, travel condition server device 230 may include a communication interface that allows travel condition server 230 to receive information from and/or transmit information to other devices in environment 200.

Network 240 may include one or more wired and/or wireless networks. For example, network 240 may include a cellular network, a public land mobile network ("PLMN"), a second generation ("2G") network, a third generation ("3G") network, a fourth generation ("4G") network, a fifth generation ("5G") network, a long term evolution ("LTE") network, and/or a similar type of network. Additionally, or alternatively, network 270 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number of devices and/or networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200. Devices of environment 200 may interconnect via wired connections, wireless connections, or a combination of wired and wireless connections.

Figure 3:
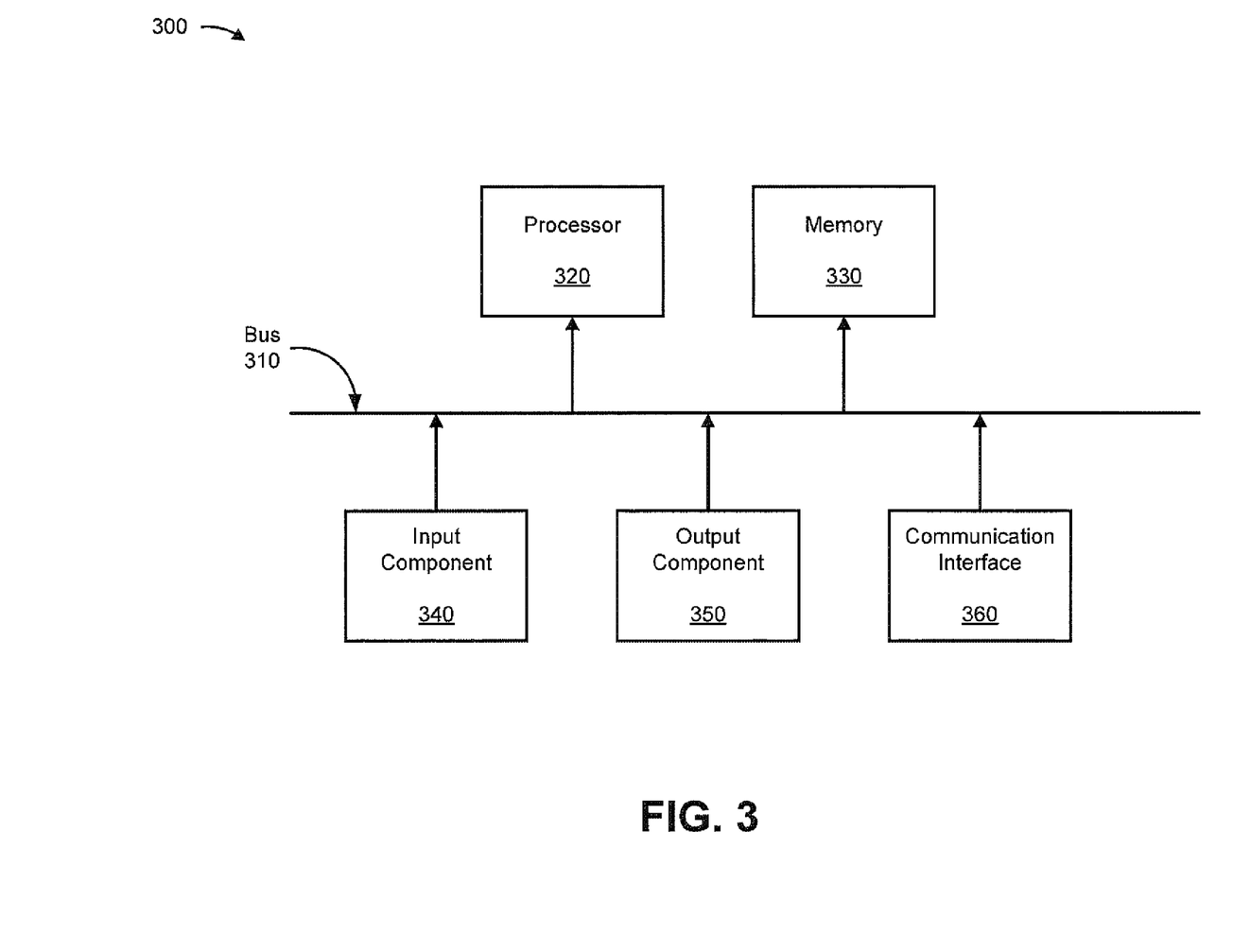
FIG. 3 is a diagram of example components of one or more devices of FIG. 2.

FIG. 3 is a diagram of example components of a device 300. Device 300 may correspond to user device 210, server device 220, and/or travel condition server device 230. As illustrated in FIG. 3, device 300 may include a bus 310, a processor 320, a memory 330, an input component 340, an output component 350, and/or a communication interface 360.

Bus 310 may include a path that permits communication among the components of device 300. Processor 320 may include a processor (e.g., a central processing unit, a graphics processing unit, an accelerated processing unit), a microprocessor, and/or another type of processing component (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). If device 300 corresponds to user device 210, input component 340 may also include a sensor for sensing information. For example, input component 340 may include a sensor, such as a camera, a microphone, an accelerometer, a gyroscope, a GPS device, a magnetometer, a gravity sensor, a rotational sensor, a temperature/thermal sensor, a proximity sensor, a light sensor, a pressure sensor, a humidity sensor, an infrared sensor, a radio wave sensor, a dual lens camera, and/or another component that permits user device 210 to receive input and/or detect conditions in the vicinity of user device 210.

Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single storage device or memory space spread across multiple storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3. Additionally, or alternatively, user device 210, server device 220, and/or travel condition server device 230 may include one or more devices 300 and/or one or more components of device 300.

Figure 4:
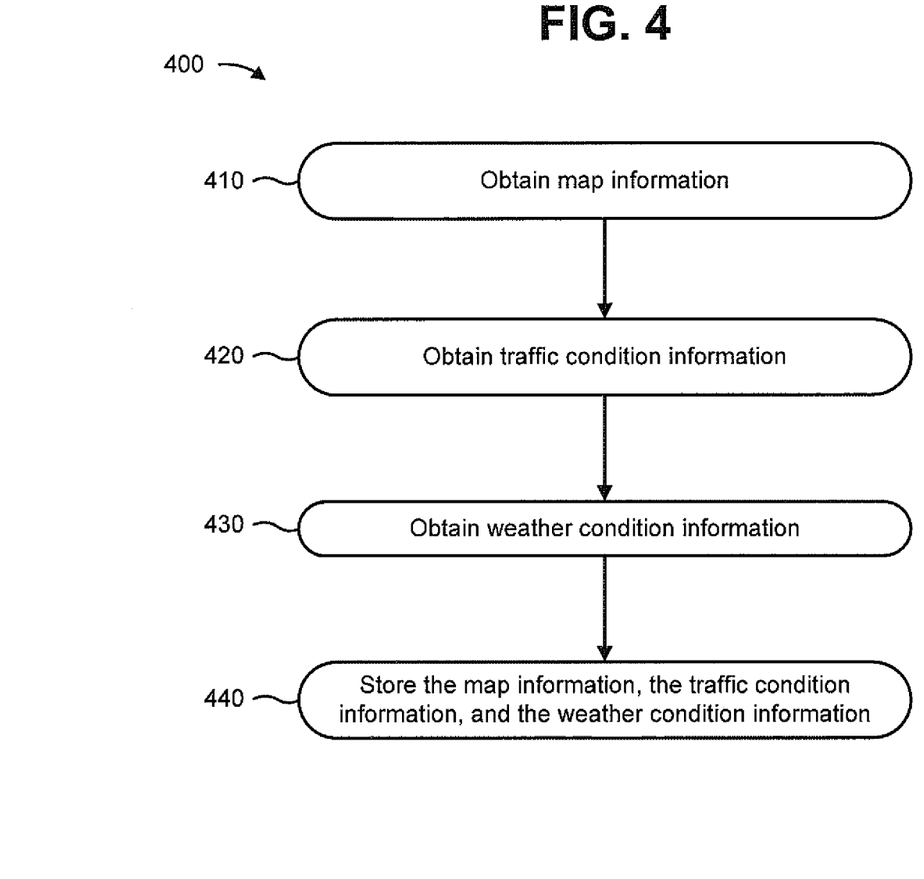
FIG. 4 is a flowchart of an example process for storing information that may be used to generate directions.

FIG. 4 is a flowchart of an example process 400 for storing information that may be used to generate directions. In some implementations, one or more process blocks of FIG. 4 may be performed by server device 220. Additionally, or alternatively, one or more process blocks of FIG. 4 may be performed by another device or a group of devices separate from or including server device 220, such as user devices 210 and/or travel condition server device 230.

As shown in FIG. 4, process 400 may include obtaining map information (block 410). For example, server device 220 may receive the map information from a map provider or from an operator, or server device 220 may generate the map information.

The map information may include a road map identifying roads and how the roads are linked. The roads may include highways, interstates, expressways, streets, and/or other thoroughfare. The map information may include information identifying types of roads (e.g., a one way street, a toll road, etc.), speed limits, locations of traffic lights, and/or locations of school zones. Additionally, or alternatively, the map information may include information identifying railroads, subways, and/or other thoroughfare. The map information may be of any geographic area. In some implementations, the map information may include a web map to be used by a network application.

As further shown in FIG. 4, process 400 may include obtaining traffic condition information (block 420). For example, server device 220 may obtain the traffic condition information from user devices 210 from traffic condition server device 230, and/or from storage associated with server device 220.

In some implementations, server device 220 may use crowdsourcing of user devices 210 to obtain the traffic condition information. For example, server device 220 may receive information from each of user devices 210 and compile the traffic condition information. The information received from user device 210 may include information input by users into user devices 210 (e.g., information indicating a destination location, a start location, a selected route to the destination location, etc.). Additionally, or alternatively, the information received from user device 210 may include information generated by user devices 210 (e.g., information indicating a current location, a current route, a speed, an acceleration, images, etc.)

Additionally, or alternatively, server device 220 may obtain the traffic condition information indicating a traffic condition from traffic condition server device 230. In some implementations, traffic condition server device 230 may receive some or all of the information from user devices 210. For example, server device 220 may collect a certain kind of information from user devices 210 (e.g., a current location of user devices 210) and another kind of information from traffic condition server device 230 (e.g., routes being taking by user devices 210). Additionally, or alternatively, server device 220 may obtain the traffic condition information from traffic condition server device 230 when the traffic condition information cannot be obtained from user devices 210, or vice versa. In some embodiments, a same kind of traffic condition information may be obtained by server device 220 from traffic condition server device 230 and user devices 210. If the traffic condition information received from user devices 210 and traffic condition server device 230 does not match or is not consistent, server device 220 may give priority to traffic condition information received from user devices 210 or traffic condition server device 230 and use the information with priority as the traffic condition information. Traffic condition server device 230 may compile traffic condition information based on the received information and provide the traffic condition information to server device 220. In some implementations, traffic condition server device 230 and/or server device 220 may aggregate traffic condition information within a predetermined area or keep the traffic condition information separate within the predetermined area. For example, an amount of traffic over a predetermined length of road made be aggregated to form traffic information for the predetermined length of road. Additionally or alternatively, information on individual stop lights over the predetermined length of road may be kept separate. In some implementations, traffic condition server device 230 may act as an offload server to aid in processing traffic-related data.

In some implementations, server device 220 may store traffic condition information relating to user devices 210 and may obtain the traffic condition information from storage associated with server device 220. For example, server device 220 may have previously provided directions to a user device 210 and may obtain, from storage, information relating to the previously provided directions as the traffic condition information (e.g., information identifying a start time, an end time, a date, a destination location, etc.). Server device 220 may update the stored traffic condition information at predetermined time intervals and/or each time server device 220 provides information to user devices 210.

The traffic condition information may indicate a traffic condition. For example, the traffic condition information may include road information about the roads included in the map information. For example, the road information may indicate a current traffic level on a road, a timing of a traffic light (e.g., a length of red light, a scheduled time for a red light to start, etc.), a location of a construction zone, a scheduled time for a construction zone, etc. The road information may be received from organizations that control roads, traffic lights, constructions schedules, etc. Additionally, or alternatively, the road information may be calculated through observation (e.g., observing a traffic light) or from information gathered from user devices 210 (e.g., an average or maximum wait time at a traffic light, a time user devices 210 stop at the traffic light, a time user devices 210 do not stop at the traffic light).

In some implementations, the traffic condition information may include trip information. For example, the trip information may indicate a route of a current trip being taken by user device 210 (e.g., a start location of the trip, a destination location of the trip, a set of directions to the destination location, a route taken so far, an average speed, an average acceleration, etc.). The trip information may indicate current information about the trip (e.g., a current location, a current speed, a current acceleration, etc.) and/or past information about the trip (e.g., a past location on the trip, a past speed at the past location on the trip, a past acceleration at the past location on the trip, etc.). The trip information may also include information regarding past trips.

Additionally, or alternatively, the traffic condition information may include user information identifying user device 210 and/or a user of user device 210. Server device 220 may associate the user information with the trip information to create past pattern information for user device 210. For example, the past pattern information may indicate past start locations, past routes, and/or past destination locations that user device 210 has used. The past pattern information may also indicate a time of day, week, month, and/or year associated with the past start locations, past routes, and/or past destination locations.

The traffic condition information may also include sensor information sensed by a sensor on user device 210. For example, the sensor information may include a temperature, a pressure, a humidity, a photo, a video, a sound, a speed, an acceleration, etc. User device 210 may gather the sensor information from sensors external to user device 210. For example, user device 210 may be in a car and receive the sensor information from sensors of the car. Server device 220 may receive sensor information at predetermined times and/or each time user device 210 communicates with server device 220.

As further shown in FIG. 4, process 400 may include obtaining weather condition information (block 430). For example, server device 220 may obtain the weather condition information from user devices 210, from traffic condition server device 230, from a weather server, and/or from storage associated with server device 220. For example, traffic condition server device 230 may store the weather condition information and allow server device 220 to access the weather condition information. Additionally, or alternatively, weather condition information may be obtained from user devices 210 indicating current weather conditions sensed by sensors in user devices 210.

The weather condition information may indicate a weather condition at a location. For example, a weather condition may include sunny, rainy, snowy, cloudy, windy, stormy, foggy, etc. The weather condition information may also indicate a severity of the weather condition (e.g., heavy rain, light rain, etc.). The weather condition may also include severe weather (a flood, a thunderstorm, a tornado, a hurricane, a wildfire, etc.). Additionally, or alternatively, the weather condition information may indicate a temperature at a location.

In some implementations, the weather condition information may indicate a weather condition at a past time. Weather condition information about a past time may provide insight on a current or future condition of roads even though the current weather at the location has changed. For example, the weather condition information may indicate that a location received a large amount of snow recently. Although it may have stopped snowing, the snow may affect the roads for the near future. For example, server device 220 may be able to predict a condition of the roads at different times in the future based on the amount of snow received, how long ago the snow was received, a current temperature, and a weather forecast (e.g., forecasted temperatures). Furthermore, information on snow removal (e.g., an average time of snow removal on a given road and/or a snow removal schedule) may be calculated based on past snow removal patterns or acquired from an organization responsible for snow removal and used to predict road conditions in the future. Thus, road conditions may be predicted in the future based on past weather conditions.

In some implementations, the weather condition information may indicate a weather condition at a current time. For example, the weather condition information may indicate it is currently raining at a location.

Additionally, or alternatively, the weather condition information may indicate a weather condition at a future time. For example, the weather condition information may indicate that rain is predicted at the location for the next three hours. In some implementations, the weather condition information may include a weather forecast for a location. Additionally, or alternatively, the weather condition information may indicate a predicted route of a weather condition (e.g., a route of a storm), predicted vector information (e.g., a direction and a speed of the weather condition), a predicted intensity of the weather condition, etc.

As further shown in FIG. 4, process 400 may include storing the map information, the traffic condition information, and the weather condition information (block 440). For example, server device 220 may store the map information, the traffic condition information, and the weather condition information in a storage device accessible by server device 220.

While a series of blocks has been described with regard to FIG. 4, the blocks and/or the order of the blocks may be modified in some implementations. Additionally, or alternatively, non-dependent blocks may be performed in parallel.

Figure 5:
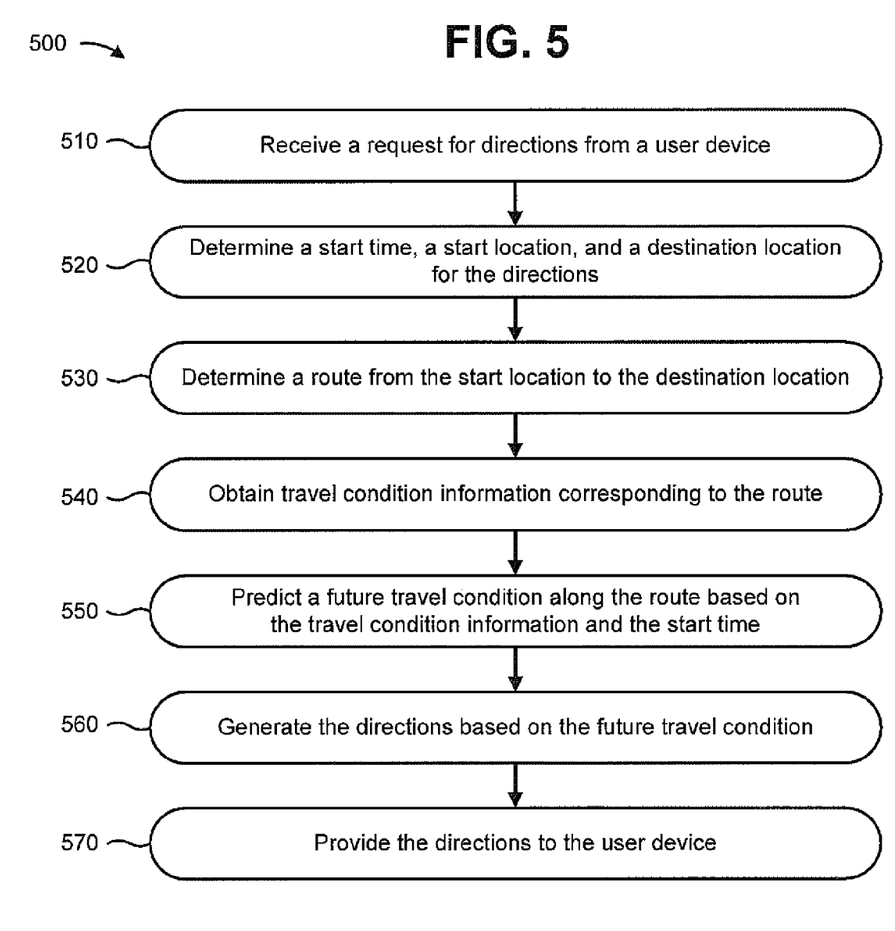
FIG. 5 is a flowchart of an example process for generating directions.

FIG. 5 is a flowchart of an example process 500 for generating directions. In some implementations, one or more process blocks of FIG. 5 may be performed by server device 220. Additionally, or alternatively, one or more process blocks of FIG. 5 may be performed by another device or a group of devices separate from or including server device 220, such as user devices 210 and/or travel condition server device 230.

As shown in FIG. 5, process 500 may include receiving a request for directions from user device 210 (block 510). For example, server device 220 may receive the request for directions from user device 210. The request may be generated by user device 210 based on a user input. For example, a user may use an application or an interface on user device 210 to request directions causing user device 210 to send the request to server device 220.

In some implementations, the request for directions may be generated by user device 210 automatically without the user requesting directions. User device 210 may sense that user device 210 is moving and send the request to server device 220. Additionally, or alternatively, server device 220 and/or user device 210 may generate the request based on the time of day. For example, if the past pattern information indicates that user device 210 commonly goes to a same destination at a certain time, server device 220 may generate a request for directions at the certain time. Thus, even though the user has not requested that user device 210 provide directions, a request for directions may be received by server device 220 so that directions can be provided to the user. For example, the user may not be aware of the future travel conditions (e.g., a traffic jam) that affect a route the user is intending to take. In such a case, user device 210 may alert the user of the future travel conditions and/or provide the user with directions that avoid the travel conditions. The alert may be text indicating the future travel condition, an image or an icon indicating the future travel condition, a color or pattern of a proposed route indicating the future travel condition, and/or a sound indicating the future travel condition. Accordingly, the user may automatically be made aware of travel conditions along the route and/or be provided with directions for a new route that avoids the travel conditions.

As further shown in FIG. 5, process 500 may include determining a start time, a start location, and a destination location for the directions (block 520). For example, server device 220 may receive information indicating the start time, the start location, and the destination location from user device 210. In some implementations, the user may use the application or the interface on user device 210 to input information indicating the start time, the start location, and the destination location, which may be transmitted by user device 210 to server device 220. Also, user device 210 may automatically determine the start time (e.g., now) and the start location (e.g., a current location).

Additionally, or alternatively, server device 220 may predict the start time, the start location, and/or the destination location. For example, as previously discussed, server device 220 may receive the request for directions without the user requesting directions. In some implementations, user device 210 may transmit current travel information indicating a current location of user device 210, a location where user device 210 started moving, and/or a route user device 210 has taken to get to the current location. Server device 220 may also store and/or obtain past pattern information indicating past start locations, past routes, and/or past destination locations user device 210 has used. The past pattern information may also indicate a time of day, week, month, and/or year associated with the past start locations, past routes, and/or past destination locations. Based on the current location of user device 210, the location where user device 210 started moving, the route user device 210 has taken to get to the current location, and/or the past pattern information, server device 220 may be able to predict a start time, a start location, and/or a destination location for the directions.

For example, the past pattern information may indicate that user device 210 travels from a location A (e.g., a user's home) to a location B (e.g., a user's office) every Monday through Friday morning using a certain route. Assume user device 210 transmits a request for directions with information indicating that user device 210 started moving from location A at 8:00 AM on a Monday. Server device 220 may predict that user device 210 is traveling to location B along the certain route based on the information transmitted from user device 210 and the past pattern information. Accordingly, server device 220 may determine that a start time for the directions is the present time, a start location for the directions is location A, and a destination location for the directions is location B. Additionally, or alternatively, server device 220 may determine multiple destination locations and provide user device 210 a list of the multiple destination locations to choose from (e.g., most common destination locations and/or most common destination locations at the current time.) In some implementations, server device 220 may determine a destination location when the destination location has been requested from the current location before and/or automatically based on previous travel.

As further shown in FIG. 5, process 500 may include determining a route from the start location to the destination location (block 530). For example, server device 220 may determine the route from the start location to the destination location based on the map information. Additionally, or alternatively, server device 220 may provide information indicating the start location and the destination location to another device to calculate the route and receive information indicating the route from the other device. In some implementations, server device 220 may determine more than one route from the start location to the destination location. The routes may indicate different ways to get from the start location to the destination location or different times to start from the start location.

In some implementations, the route may include a series of roads leading from the start location to the destination location. In some implementations, server device 220 may determine multiple possible routes between the start location and the destination location.

As further shown in FIG. 5, process 500 may include obtaining travel condition information corresponding to the route (block 540). For example, server device 220 may obtain the travel condition information from travel condition server device 230 and/or from storage. In some implementations, the travel condition information may include the traffic condition information obtained at block 420 and/or the weather condition information obtained at block 430 in process 400 (FIG. 4). The travel condition information may indicate travel conditions on or near the route. In some implementations, server device 220 may obtain travel condition information corresponding to more than one route (e.g., each route determined at block 530).

As further shown in FIG. 5, process 500 may include predicting a future travel condition along the route based on the travel condition information and the start time (block 550). For example, server device 220 may predict one or more future travel conditions along the route. In some implementations, server device 220 may predict one or more future travel conditions along multiple routes (e.g., each route determined at block 530). The future travel condition may include a condition that is predicted to happen in the future, but that may not be present at the current time. For example, the future travel condition may include a future weather condition and/or a future traffic condition.

In some implementations, server device 220 may predict the future weather condition based on the weather condition information obtained at block 430, the start time, and the route. For example, the weather condition information may indicate a storm is moving into an area overlapping the route. Server device 220 may calculate a time and a location at which the storm will intersect the route based on the start time. Additionally, or alternatively, server device 220 may calculate a time the storm will pass over the route. Accordingly, even though the future weather condition (e.g., a storm) may not be currently affecting the route, server device 220 may predict an intersect location where the future weather condition will affect the route at a future time.

In some implementations, server device 220 may predict the future traffic condition based on the traffic condition information obtained at block 420, the start time, and/or the route. For example, service device 220 may use past pattern information included in the traffic condition information to predict the future traffic condition. The past pattern information may indicate times and locations where traffic conditions commonly happen. For example, the past pattern information may indicate that heavy traffic is common at 5:00 PM on weekdays along a certain road. Thus, server device 220 may predict heavy traffic at 5:00 PM on a future weekday along the certain road.

Additionally, or alternatively, server device 220 may use information about current trips being taken by user devices 210 to predict the future traffic condition. For example, the travel condition information may indicate that a large number of user devices 210 have a same destination location (e.g., a football stadium) and will converge at the destination location around the same time in the future (e.g., at a start of a football game). Thus, even though there is not traffic at the destination location presently, server device 220 may predict heavy traffic at the destination location in the future.

In some implementations, the travel condition information may indicate road information that may be used to predict the future traffic condition. For example, the travel condition information may indicate road construction is scheduled to end at a construction location along the route in one hour. Thus, even though there may presently be heavy traffic at the construction location, server device 200 may predict light traffic at the construction location by the time user device 210 gets there.

In some implementations, the travel condition information may include traffic light information that may be used to predict the future travel condition. For example, traffic lights may cause different delays depending on an amount of traffic. This phenomena may be modeled with fluid dynamics. For instance, when a traffic light is red, cars line up and form a traffic jam, thus causing a slowdown at the end of the line of cars. As the traffic light turns green, cars at the front of the line begin to accelerate one by one, like a released pressure point, creating a wave. Depending on the amount of traffic, multiple waves may be formed by multiple traffic lights. For example, the heavier the traffic, the worse a delay cars at the end of the line will experience. The cars at the end of the line may not make the first light, and those cars that make the first light may not make the second light because there is not enough time to accelerate to a threshold velocity and go past the second traffic light before the second traffic light turns red.

Server device 220 may predict the amount of traffic at a first and second traffic light using an algorithm based on fluid dynamics. For example, assume a time between the first traffic light turning green and the second traffic light turning red is time $T_{GR}$. In other words, time $T_{GR}$ is the time a car (e.g., containing user device 210), stopped at the first traffic light, has to make it through the second traffic light before the second traffic light turns red. Time $T_{GR}$ and/or the timing of the traffic lights may be included in the travel condition information.

For a car to make it through the second traffic light, $T_{GR} \geq T_A + T_{CV} + T_W$ must be satisfied, where $T_A$ is a time that the car is accelerating, $T_{CV}$ is a time that the car is moving at a constant velocity, and $T_W$ is a time that the car is stopped waiting to start accelerating.

Time $T_A$ may be calculated using $T_A = V/A$, where V is a threshold velocity between the traffic lights, and A is an acceleration of the car. Threshold velocity V may be obtained from the travel condition information. For example, threshold velocity V may be a speed limit of the road or may be determined from crowdsourcing user devices 210 to determine an average constant velocity between the traffic lights. Acceleration A may also be obtained from the travel condition information. For example, the sensor information gathered from user devices 210 may indicate an average acceleration for each user device 210. For instance, an average acceleration may be different for a car than for a semi-truck. Accordingly, different accelerations A can be used depending on a type of vehicle, previously associated with user device 210, predicted to be at the traffic lights. Additionally, or alternatively, acceleration A may be based on average accelerations of cars in the front of the line. For example, even though a car may have a higher average acceleration than a semi-truck, if a car is behind a semi-truck at the traffic light, the car's acceleration may be lower than average.

Time $T_{CV}$ may be calculated using $T_{CV}=(X-(\frac{1}{2})*A*T_A^2)/V$, where X is a distance between the car and the second stop light. The distance X may be obtained or calculated from the travel condition information and/or the map information.

Time $T_W$ may be calculated based on the number of cars predicted to be in line at the first stop light, which may be predicted from the travel condition information. Additionally, or alternatively, acceleration information and velocity information of cars in line may be used to determine time $T_W$.

Accordingly, a future travel condition caused by consecutive traffic lights may be predicted based on whether $T_{GR} \geq T_A + T_{CV} + T_W$ is satisfied for each car predicted to be at the traffic lights. For example, a predicted delay caused by the two stop lights (i.e., a future travel condition) may change dramatically based on a small difference in the number of cars predicted to be at the traffic lights. Even one extra car stopped at the first traffic light may cause enough of a delay to prevent another car from making it through the second traffic light. Thus, one extra car may cause another car to wait at a red light at which the other the car would otherwise not have had to wait. However, a predicted delay caused by traffic lights can be more accurately calculated using the algorithm described above based on fluid dynamics.

As further shown in FIG. 5, process 500 may include generating the directions based on the future travel condition (block 560). For example, server device 220 may generate the directions based on the future travel condition.

In some implementations, the directions may include turn-by-turn directions and/or map information. Additionally, or alternatively, the directions may indicate the route. The directions may also include information about the future travel condition. For example, the directions may indicate a time and a location the route is predicted to intersect with a storm and/or experience heavy traffic.

Server device 220 may determine a time and a location the route is predicted to intersect the future travel condition by breaking up the route into segments and/or points along the route. For example, server device 220 may calculate a time user device 210 will arrive at a segment and/or point along the route based on a distance to the segment and speed limits along the route to the segment. In some implementations, the calculation may compensate for future travel conditions. For example, assume server device 220 calculates a time of arrival at points A and B along a route. Additionally, assume there are no future travel conditions predicted along the route to point A and the average speed of cars is the speed limit. The average speed of the cars may be obtained along the route to point A by crowdsourcing user devices 210 and/or relying on known speed limits obtained from travel condition server device 230. Thus, server device 220 may calculate a time of arrival at point A based on a start time, a distance to point A, and a speed limit of roads along the route to point A. Further, assume that at the predicted arrival time at point A, there is heavy traffic (i.e., a future travel condition) predicted from point A to point B along the route and the average speed is only half the posted speed limit along the route from point A to point B. Thus, server device 220 may calculate the arrival time at point B based on the arrival time at A, the heavy traffic (e.g., an average speed of cars), and a distance from point A to point B. Likewise, an arrival time at each subsequent segment or point along the route may be estimated based on an arrival time at a previous point along the route, a distance to the next point, a speed, and/or a future travel condition between the previous point and the next point.

Additionally, or alternatively, once user device 210 actually arrives at a particular point or segment along the route, the predicted arrival times at subsequent points or segments may be updated to compensate for any difference between the actual arrival time at the particular point and the estimated arrival time at the particular point. For example, a user may make an unscheduled stop (e.g., to eat or get gas) along the route which would affect the arrival times at subsequent points along the route. Additionally, or alternatively, scheduled stops may be compensated for and used to predict arrival times. For example, a user may input into user device 210 an hour long stop at a particular location, and user device 210 may transmit such information to server device 220. In some implementations, user device 210 and/or server device 220 may obtain information on scheduled stops by synching with a calendar stored on user devices 210 and/or an online colander. Server device 220 may then calculate arrival times based on the scheduled stop (e.g., a time of the stop, a location of the stop, and a length of the stop).

The directions may also include information for multiple routes and for multiple future travel conditions. Additionally, or alternatively, the directions may indicate a predicted arrival time at the destination location. For example, server device 220 may calculate the predicted arrival time based on the start time, the route, and the future travel condition(s). In some implementations, the directions may include information to be displayed by user device 210.

Server device 220 may generate the directions based on a route selected to avoid the future travel condition. For example, if a first route determined at block 530 is predicted to have heavy traffic in the future, server device 220 may generate the directions based on a second route determined at block 530 that is predicted to have less traffic. As another example, if the first route is determined to go through a storm, server device 220 may generate the directions based on another route that is predicted to go around the storm. Additionally, or alternatively, server device 220 may generate directions for multiple routes.

In some implementations, server device 220 may generate the directions using a different start time to avoid the future travel condition. For example, server device 220 may generate the directions using a same route but at a different start time. Accordingly, an earlier start time may allow user device 210 to avoid the future travel condition (e.g., a storm and/or heavy traffic) along the route that user device 210 may run into using a later start time. Additionally, or alternatively, server device 220 may generate directions based on multiple start times.

In some implementations, server device 220 may generate the directions to mitigate the future travel condition. For example, server device 220 may generate different directions for user devices 210 in order to spread out traffic and avoid a predicted traffic jam that may occur if the same directions were provided to multiple user device 210. For instance, assume a large number of people are leaving a same office building at the same time and all need to use the same highway to get home. Server device 220 may provide different routes to the highway to mitigate predicted heavy traffic along the most common route from the office to the highway. Server device 220 may determine which route to provide to which user device 210 based on an order the requests for directions are received. For example, server device 220 may alternate which route is provided to spread the traffic among different routes. In some implementations, server device may determine which route to provide based on a kind of user device 210, a kind of application executed on user device 210, and/or another way of distinguishing between user devices 210. For example, server device may provide a different route to user devices 210 running a first kind of application than user devices 210 running a second kind of application.

In some implementations, server device 220 may have predicted the destination location and the route to the predicted destination location (e.g., when the user did not request directions). For example, server device 220 may have predicted that a user is currently using a past route included in the past pattern information to go to a past destination location. Server device 220 may generate the directions to give a user a different route to take to the predicted destination location than the past route. For example, the different route may avoid a future travel condition while the past route may intersect the future travel condition. Thus, even though the user may not have requested directions, server device 220 may predict the route the user is currently taking, alert the user to a future travel condition in the predicted route, and provide the user with directions to avoid the future travel condition.

In some implementations, may generate the directions to include multiple possible routes. Server device 220 may score each route based on the future travel condition. The score may indicate the safety of a route (e.g., a score based on weather conditions along the route), and/or a speed of a route (e.g., a score based on weather conditions and traffic conditions). The score may weight future travel conditions along the route differently. For example, a snow storm may have a greater influence on the score than heavy traffic. Thus, a route with a snow storm may have a lower score than a route with heavy traffic, or vice versa. Accordingly, a user may have the option of selecting a route using the scores and/or server device 220 may generate the directions by selecting routes based on the scores.

In some implementations, an initially determined route with future travel conditions may still be included in the directions because future conditions are worse along alternate routes. Server device 220 may provide an alert to user device 220 indicating the future travel conditions along the route. For example, the alert may indicate the reasons for selecting a particular route and any issues with the route.

As further shown in FIG. 5, process 500 may include providing the directions to user device 210 (block 570). For example, server device 500 may transmit the directions to user device 210 over network 240. In this way, a user of user device 210 may be provided with directions that take into account a future travel condition.

In some implementations, server device 220 may update the prediction of the future travel condition and provide updated directions to user device 210. In this way, a user may be provided with directions based on updated and/or real time predictions of future travel conditions. For example, server device 220 may originally predict heavy traffic at a location and at a future time, and provide directions based on this original prediction. However, after the user starts a trip, new travel condition information may be obtained by server device 220 and indicate light traffic at the location. Accordingly, server device 220 may update the directions to include a route that goes through the location and provide the updated directions to user device 210. Additionally, or alternatively, the new directions may indicate if the user should speed up or slow down to avoid a future travel condition.

While a series of blocks has been described with regard to FIG. 5, the blocks and/or the order of the blocks may be modified in some implementations. Additionally, or alternatively, non-dependent blocks may be performed in parallel.

Figure 6:
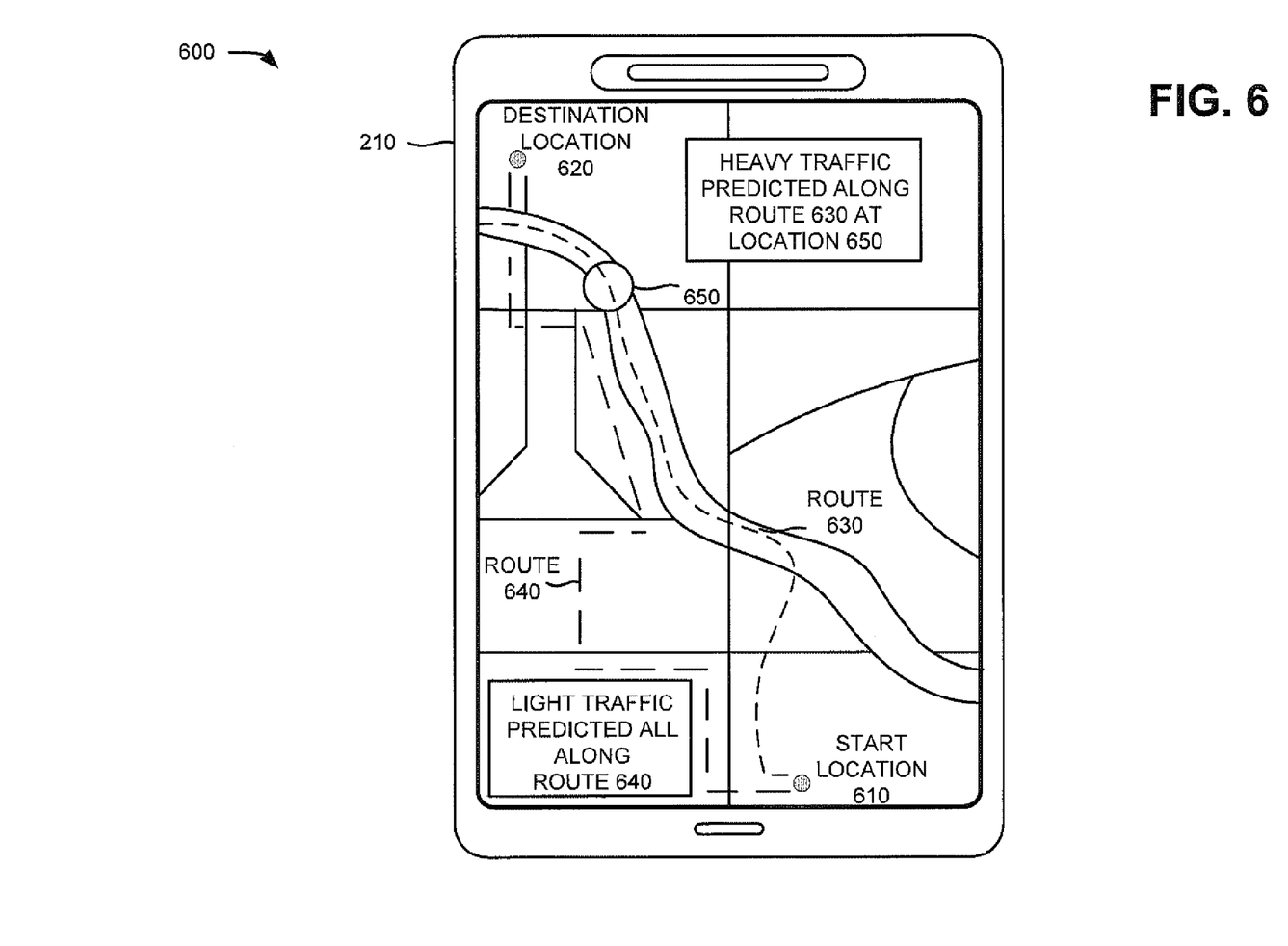
FIG. 6 is a diagram of an example implementation relating to the example process shown in FIG. 5.

FIG. 6 is a diagram of an example implementation 600 relating to process 500 shown in FIG. 5. In example implementation 600, user device 210 is provided with directions indicating two routes from a start location 610 to a destination location 620 based on predicted future traffic.

Assume user device 210 transmits a request for directions to server device 220. Assume that a user of user device 210 also inputs start location 610, destination location 620, and a start time, which user device 210 provides to server device 220. Further, assume server device 220 determines two routes, a route 630 and a route 640, from start location 610 to destination location 620. Based on travel condition information obtained from user devices 210, server device 220 may predict a future travel condition for route 630 and for route 640.

For instance, server device 220 may predict heavy traffic at a location 650 along route 630 and at a future time user device 210 is predicted to be at location 650. For example, the travel condition information may be used to predict that a large number of user devices 210 will interest at location 650 at the future time based on the intended routes of user devices 210. Accordingly, server device 220 may predict a large delay for any user device 210 at location 650 at the future time.

Additionally, or alternatively, server device 220 may predict light traffic all along route 640 at future times user device 210 is predicted to be along route 640. For example, the travel condition information may be used to predict a small number of user devices 210 will intersect user device 210 along route 640.

Accordingly, server device 220 may generate and provide directions to user device 210 based on the predicated travel conditions (e.g., heavy traffic and light traffic). For example, the directions may include map information. The directions may also indicate route 630 and that heavy traffic is predicted at location 650. The directions may also indicate route 640 and that light traffic is predicted all along route 640.

As illustrated in FIG. 6, user device 210 may display information based on the directions provided from server device 220. For example, user device 210 may display information indicating start location 610 and destination location 620 on a road map. Route 630 may be displayed on the road map by a dotted line and route 640 may be displayed by a dashed line.

Moreover, user device 210 may display information about the predicted future travel conditions. For example, user device 210 may display a message, "HEAVY TRAFFIC PREDICTED ALONG ROUTE 630 AT LOCATION 650." Thus, the user can be informed that heavy traffic is predicted at location 650 in the future and that the user should use a different route. Similarly, user device 210 may display a message, "LIGHT TRAFFIC PREDICTED ALL ALONG ROUTE 640." Thus, the user can be informed that light traffic is predicted all along route 640. Although not illustrated in FIG. 6, predicted arrival times for each route may also be displayed.

Figure 7A:
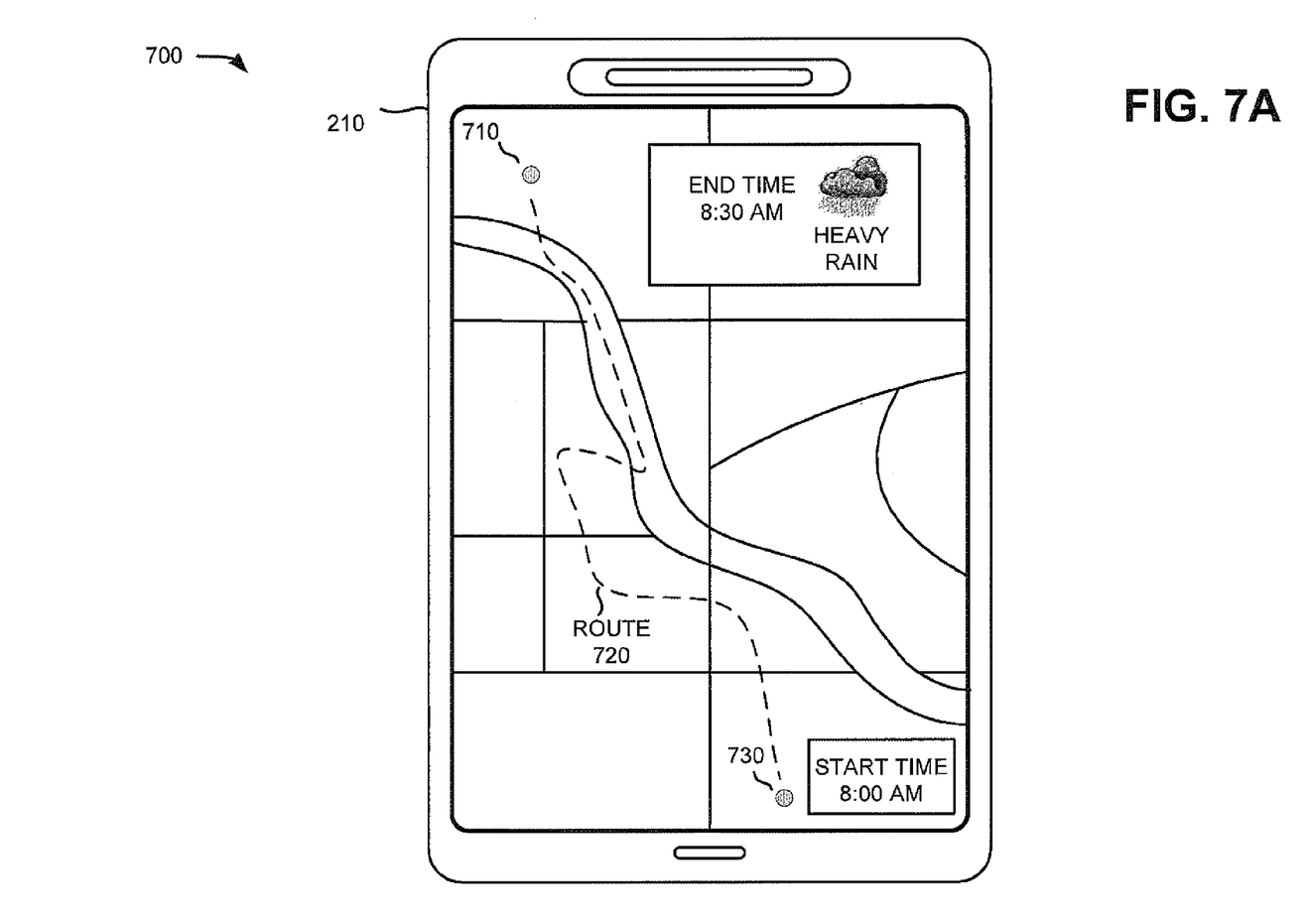
FIGS. 7A and 7B are diagrams of an example implementation relating to the example process shown in FIG. 5.
Figure 7B:
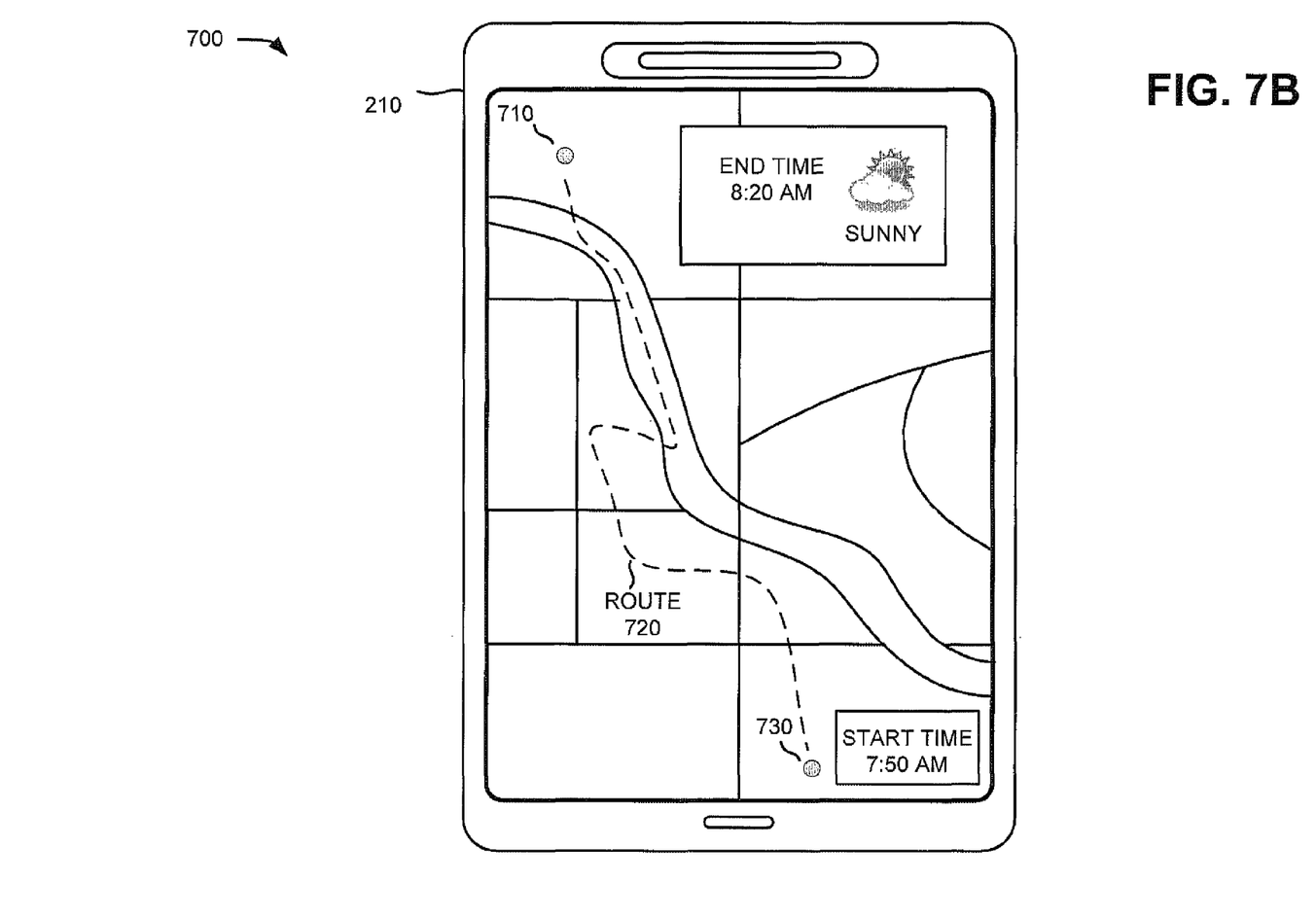

FIGS. 7A and 7B are diagrams of an example implementation 700 relating to process 500 shown in FIG. 5. In example implementation 700, user device 210 is provided with directions indicating the predicted weather at a destination location 710 and at a time that user device 210 is predicted to arrive at destination location 710.

FIG. 7A is a diagram illustrating information displayed by user device 210 based on directions provided from server device 220. For example, the directions may indicate a route 720 from a start location 730 to destination location 710. The directions may be based on a start time of 8:00 AM input by the user. Based on the start time and the route, the directions may indicate that a predicted arrival time is 8:30 AM. The directions may also indicate that at 8:30 AM, heavy rain is predicted at destination location 710. Accordingly, user device 210 may display information indicating heavy rain is predicted at destination location 710 at 8:30 AM. In this way, a user may be informed that if the user leaves start location 730 at 8:00 AM, the user can expect heavy rain at destination location 710 by the time the user arrives at destination location 710.

FIG. 7B is a diagram illustrating information displayed by user device 210 based on directions provided from server device 220. Even though the user may have input 8:00 AM as a requested start time, server device 220 may provide directions based on other start times. For example, server device 220 may predict rain at destination location 710 and generate directions to avoid the predicted rain.

For example, the directions may be based on a different start time (e.g., 7:50 AM) as shown in FIG. 7B. Based on the start time and the route, the directions may indicate that a predicted arrival time is 8:20 AM. The directions may also indicate that at 8:20 AM, sunny skies are predicted at destination location 710. Accordingly, user device 210 may display information indicating sunny skies are predicted at destination location 710 at 8:20 AM. In this way, the user may be informed that by leaving ten minutes earlier, the user can avoid arriving at destination location 710 while it is raining.

Implementations described herein may provide a user with more desirable directions by predicting future travel conditions and providing directions based on the future travel conditions.

The foregoing disclosure provides illustration and description, but is not intended to be exhaustive or to limit the implementations to the precise form disclosed. Modifications and variations are possible in light of the above disclosure or may be acquired from practice of the implementations.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

As used herein, the term "component" is intended to be broadly construed as hardware, firmware, or a combination of hardware and software.

Some implementations are described herein in conjunction with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein. In some implementations, the user interfaces may be customizable by a user or a device. Additionally, or alternatively, the user interfaces may be pre-configured to a standard configuration, a specific configuration based on a type of device on which the user interfaces are displayed, or a set of configurations based on capabilities and/or specifications associated with a device on which the user interfaces are displayed.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
one or more processors to:
receive a request for directions from a user device;
determine a start time, a start location, and a destination location for the directions;
determine that the user device is currently on a past route from the start location to the destination location based on past pattern information,
the past route being included in the past pattern information;
obtain travel condition information corresponding to the past route,
the travel condition information indicating at least one of a traffic condition or a weather condition;

predict a future travel condition along the past route based on the travel condition information and the start time,
the travel condition information including information indicating a weather condition at a time prior to a current time, and
the future travel condition including:
a predicted weather condition at a predicted arrival time at the destination location, and
a predicted road condition, along the past route, that is predicted based on the weather condition at the time prior to the current time;
generate directions for an alternate route based on the future travel condition,
the alternate route being different from one or more routes, generated for one or more other user devices, to mitigate the future travel condition,
the alternate route and the one or more routes including the start location and a particular intermediary location, and
the alternate route having a different route toward the particular intermediary location than the one or more routes; and
provide, to the user device, the directions for the alternate route, information identifying the predicted weather condition, and information identifying the predicted arrival time.

2. The device of claim 1, where the one or more processors are further to:
generate a different start time to address the future travel condition.

3. The device of claim 1, where the one or more processors are further to:
obtain the past pattern information,
the past pattern information indicating at least one location to which the user device has previously traveled; and
predict the destination location based on the past pattern information.

4. The device of claim 1, where the one or more processors are to:
obtain current travel information indicating at least one of:
a current location of the user device,
a location where the user device started moving, or
a current route the user device is using; and
predict the destination location based on the past pattern information and the current travel information.

5. The device of claim 1, where the predicted weather condition is associated with a first weight and the predicted road condition is associated with a second weight; and
where the one or more processors, when generating the directions for the alternate route, are to:
generate the directions for the alternate route based on the first weight and the second weight.

6. The device of claim 1, where the one or more processors are further to:
generate directions for multiple alternate routes based on the future travel condition.

7. The device of claim 1, where the one or more processors, when providing, to the user device, the directions for the alternate route, are to:
provide, to the user device, the directions for the alternate route, instead of directions for the one or more routes, based on an order in which requests for directions are received from the user device and the one or more other user devices.

8. A computer-readable medium storing instructions, the instructions comprising:
a plurality of instructions that, when executed by a processor of a device, cause the processor to:
receive a request for directions from a user device;
determine a start time, a start location, and a destination location for the directions;
determine that the user device is currently on a past route from the start location to the destination location based on past pattern information,
the past route being included in the past pattern information;
obtain travel condition information related to the past route,
the travel condition information indicating at least one of a current condition along the past route or a planned condition along the past route;
predict a first future travel condition that intersects the past route at a future time based on the start time, the travel condition information, information regarding a first segment of the past route, and a second future travel condition for a second segment of the past route,
the travel condition information including at least one of:
information indicating a weather condition at a time prior to a current time,
information regarding a location, of the user device, prior to the start location,
information regarding a speed, of the user device, prior to the start time, or
information regarding an acceleration, of the user device, prior to the start time;
generate directions for an alternate route based on the first future travel condition,
the alternate route being different from one or more routes, generated for one or more other user devices, to mitigate the first future travel condition,
the alternate route and the one or more routes including the start location and a particular intermediary location, and
the alternate route having a different route toward the particular intermediary location than the one or more routes; and
provide the directions for the alternate route to the user device.

9. The computer-readable medium of claim 8, where the travel condition information is obtained by crowdsourcing a plurality of user devices and from a server device.

10. The computer-readable medium of claim 8, where the travel condition information indicates at least one of a planned route or a planned destination location for a plurality of user devices,
where the plurality of instructions, when executed by the processor, further cause the processor to:
determine an intersect location where the plurality of user devices will intersect the past route at the future time based on the at least one of the planned route or the planned destination location for the plurality of user devices; and
where the plurality of instructions, that cause the processor to predict the first future travel condition, cause the processor to:
predict the first future travel condition based on the intersect location.

11. The computer-readable medium of claim 8, where the travel condition information indicates a predicted weather pattern, and
  where the plurality of instructions, when executed by the processor, further cause the processor to:
    determine an intersect location where the predicted weather pattern will intersect the past route at the future time; and
  where the plurality of instructions, that cause the processor to predict the first future travel condition, cause the processor to:
    predict the first future travel condition based on the intersect location.

12. The computer-readable medium of claim 8, where the travel condition information indicates a timing of a traffic light, and
  where the plurality of instructions, when executed by the processor, cause the processor to:
    determine an amount of traffic caused by the traffic light at the future time based on the timing of the traffic light; and
  where the plurality of instructions, that cause the processor to predict the first future travel condition, cause the processor to:
    predict the first future travel condition based on the amount of traffic.

13. The computer-readable medium of claim 8, where the first future travel condition corresponds to an amount of traffic at a location along the past route at the future time, and
  where the amount of traffic is independent of an amount of traffic present at the location along the past route at the current time.

14. The computer-readable medium of claim 8, where the first future travel condition is a weather condition at a location along the past route at the future time, and
  where the weather condition is independent of a weather condition present at the location along the past route at the current time.

15. The computer-readable medium of claim 8, where the directions include information, about the first future travel condition, to be displayed on the user device.

16. A method, comprising:
  identifying, by a device, that a user device is currently on a past route to a destination location based on past pattern information and without receiving a request for directions,
    the past route being included in the past pattern information;
  acquiring, by the device, travel condition information associated with the past route,
    the travel condition information indicating a travel condition along the past route;
  predicting, by the device, a future travel condition occurring at a future time along the past route based on the travel condition information and a start time,
    the travel condition information including information indicating a particular weather condition at a time prior to a current time, and
    predicting the future travel condition including:
      predicting a weather condition at an arrival time at the destination location, and
      predicting a road condition, along the past route, based on the particular weather condition at the time prior to the current time;
  generating, by the device, directions for an alternate route based on the future travel condition,
    the alternate route being different from one or more routes, generated for one or more other user devices, to mitigate the future travel condition,
    the alternate route and the one or more routes including a starting location and a particular intermediary location, and
    the alternate route having a different route toward the particular intermediary location than the one or more routes; and
  transmitting, by the device and to the user device for display, the directions for the alternate route, information identifying the predicted weather condition, and the arrival time.

17. The method of claim 16, further comprising:
  determining the arrival time at the destination location based on the future travel condition.

18. The method of claim 16, where the road condition is independent of a road condition present along the past route at the current time.

19. The method of claim 16, where generating the directions for the alternate route includes:
  generating the directions for the alternate route based on a plurality of start times.

20. The method of claim 16, further comprising:
  updating the future travel condition based on updated travel condition information;
  generating updated directions based on the updated future travel condition; and
  providing the updated directions to the user device.

* * * * *